United States Patent [19]
Fader et al.

[11] 3,782,769
[45] Jan. 1, 1974

[54] ENERGY ABSORBER FOR VEHICLE BUMPERS AND THE LIKE

[75] Inventors: John H. Fader; Robert W. Hegel; Burke A. West, all of Monroe, Mich.

[73] Assignee: Monroe Auto Equipment Company, Monroe, Mich.

[22] Filed: June 1, 1971

[21] Appl. No.: 148,642

[52] U.S. Cl. ................ 293/88, 267/35, 188/314
[51] Int. Cl. ................ B60r 19/06, F16f 3/00
[58] Field of Search .................... 213/43, 223; 188/266, 297, 314; 267/35, 64 R, 64 A, 64 B, 65 R, 139, 140; 293/1, DIG. 2, 70, 85, 86, 88, 89

[56] References Cited
UNITED STATES PATENTS

| | | | |
|---|---|---|---|
| 2,187,625 | 1/1940 | Mercier | 213/223 |
| 2,856,035 | 10/1958 | Rohacs | 188/88 |
| 3,254,883 | 6/1966 | Morgan | 267/1 |
| 3,285,596 | 11/1966 | Burgert | 207/64 |
| 3,294,391 | 12/1966 | Smith et al. | 267/64 A |
| 3,424,448 | 1/1969 | Chak Ma | 267/35 |
| 3,514,144 | 5/1970 | Alderfer | 293/71 |
| 3,525,511 | 8/1970 | Bainbridge | 267/64 R |

FOREIGN PATENTS OR APPLICATIONS 581,417  10/1946  Great Britain ............ 267/64 R

*Primary Examiner*—Gerald M. Forlenza
*Assistant Examiner*—Robert Saifer
*Attorney*—Harness, Dickey & Pierce

[57] ABSTRACT

An energy absorber for vehicle bumpers and the like comprising a pair of telescopic tubular housings, with one of the housings containing a high energy spring and the other of the housings containing a fluid reservoir, whereupon impact of the vehicle bumper with an object, fluid within the reservoir is forced through a control device to effect rapid deceleration of the vehicle and compress the high energy spring.

30 Claims, 4 Drawing Figures

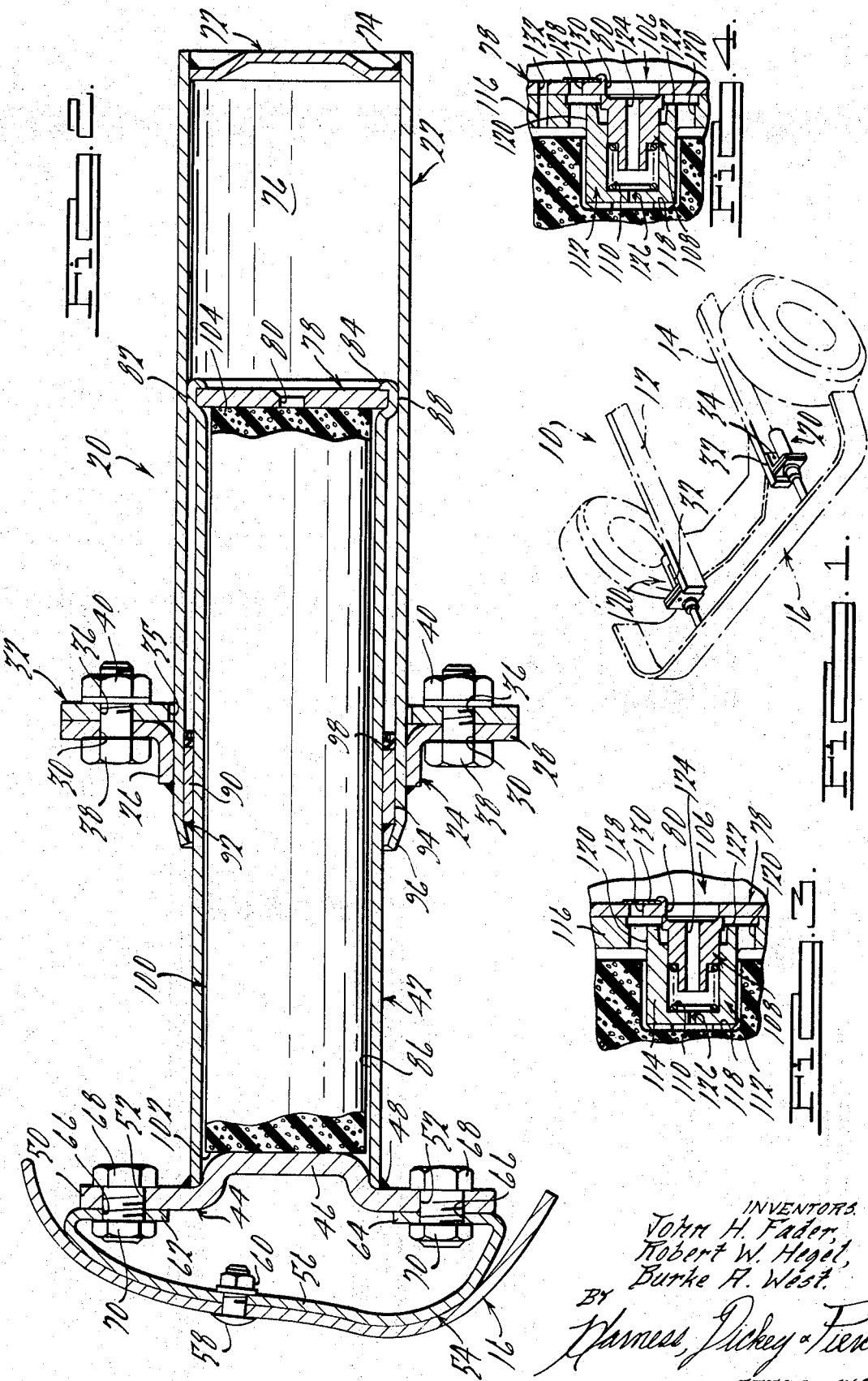

ENERGY ABSORBER FOR VEHICLE BUMPERS AND THE LIKE

BACKGROUND OF THE INVENTION

It is well known that front and rear end vehicular impact at a speed of as low as 5 miles per hour will cause substantial vehicle damage. In order to mitigate the financial burden upon the public, legislation has been proposed requiring that all automotive vehicles be able to withstand at least a 5 mile per hour barrier impact without incurring any appreciable damage. In order to come within the regulations of such legislation, most automobile manufacturers are contemplating the use of high impact energy absorbers at at least the front end, and eventually at both the front and rear ends, of vehicles to be manufactured in the future.

While there has been a wide variety of different types of energy absorbers known in the prior art which have been capable, at least to some degree, of absorbing the high impact energy created in a vehicle collision, most, if not all, such prior known devices have been incapable of satisfying the strict design criteria that has been established. In particular, due to certain design compromises in modern automotive vehicles, there is a maximum impact force that a vehicle can withstand without component failure occurring. This could be a bumper bolt or engine mount shearing, for example, as well as a myriad of many other things. The automotive industry has indicated a maximum allowable force that can be transmitted to a basic frame or chassis structure is in the range of 10,000 to 12,000 pounds. The energy to stop a four thousand pound mass (weight of a typical automotive vehicle) moving at a velocity of 5 miles per hour, or 7.33 feet per second, is 40,000 inch-pounds, and where 10,000 pounds is the maximum allowable force or load which can be incurred by the vehicle per energy absorbing unit, and where two units are used, a square force displacement curve is required having a 2-inch stroke. As previously mentioned, prior known energy absorbing devices which would be economically feasible on modern mass produced automotive vehicles have been incapable of absorbing or dissipating a 10,000 pound force in a 4-inch stroke and as such, fall far short of satisfying the established operational requirements.

SUMMARY OF THE INVENTION

The present invention relates to an energy absorber unit which has been found to exhibit considerably superior operating characteristics, as compared with the various analogous devices known in the prior art; more importantly, however, the present invention has been found to readily satisfy the established design criteria, i.e., of absorbing the impact force of a 5 mile per hour collision in approximately a 3-inch stroke. Generally speaking, the energy absorber of the present invention comprises a pair of concentrically oriented, telescopic tubular housings, one of which contains a high energy spring, and the other of which contains a fluid reservoir and means defining a flow orifice for communicating fluid into the housing containing the spring. Upon impact, the two housings telescope, whereby fluid is forced through the orifice which is calibrated so that approximately the maximum specified system force is caused. This restraining force causes the vehicle to begin to decelerate; however, as the velocity decreases, so does the hydraulic force. For this reason, after the fluid passes through the orifice, it functions to compress the high energy spring, with the result that the spring force increases concomitantly with a decrease in the hydraulic source, thus approximating the maximum allowable restraining force through the stroke. As will hereinafter be described in detail, the high energy spring is designed so that it will force the hydraulic fluid back into the reservoir, as well as return the unit to its original extended position, with the result that the energy absorber of the present invention is entirely self-resetting preparatory a subsequent collision or impact.

It is accordingly a general object of the present invention to provide a new and improved energy absorber for use in operative association with automotive vehicle bumpers and the like.

It is a more particular object of the present invention to provide a new and improved energy absorber which utilizes both hydraulics and a high energy spring.

It is yet a more particular object of the present invention to provide a high energy absorber unit which utilizes a micro cellular fluid impervious spring.

It is another object of the present invention to provide an energy absorber which is of a strong, durable construction and is capable of absorbing high impact energy with a minimum stroke.

It is yet another object of the present invention to provide an energy absorber which may be subjected to substantial bending forces as might occur when a vehicle is jacked-up by its associated bumper.

It is still another object of the present invention to provide an energy absorber unit wherein the high energy spring acts to vary the discharge coefficient of the flow control orifice.

It is yet a further object of the present invention to provide a new and improved energy absorber which is both velocity and displacement sensitive.

It is another object of the present invention to provide a new and improved energy absorber of the above described type wherein the unit "bottoms out" on the high energy spring to prevent damage to the telescopic housings during an impact absorbing cycle.

It is still a further object of the present invention to provide an energy absorber of the above described type including a housing which is capable of expanding in order to absorb impact energy in excess of the design capacity of the unit.

It is still a further object of the present invention to provide an energy absorber which is of a simple design, is economical to manufacture and easy to install.

Other objects and advantages of the present invention will become apparent from the following detailed description taken in conjunction with the accompanying drawing.

APPLICABLE PRIOR ART

The following patents are believed to be pertinent with regard to the subject matter disclosed and claimed herein:

| Patent No. | Inventor | Date |
|---|---|---|
| 3,424,448 | F. T. Chak Ma | 1/28/69 |
| 3,525,511 | W. N. Bainbridge | 8/25/70 |

BRIEF DESCRIPTION OF THE DRAWINGS

FIG. 1 is an elevated perspective view of a pair of energy absorber units constructed in accordance with the present invention and shown in operative association with a schematic representation of a portion of a conventional automotive vehicle;

FIG. 2 is an enlarged longitudinal cross-sectional view of one of the energy absorber units shown in FIG. 1;

FIG. 3 is a fragmentary cross-sectional view of a slightly modified embodiment of the fluid flow control portion of tbe energy absorber unit shown in FIG. 2; and FIG. 4 is a fragmentary view of yet another embodiment of the flow control portion of the energy absorber unit shown in FIG. 2.

DETAILED DESCRIPTION OF THE PREFERRED EMBODIMENTS

Referring now to FIG. 1 of the drawing, a schematic representation of a vehicle frame or chassis is representatively designated by the numeral 10 and is shown as comprising a pair of longitudinally extending spaced parallel frame members 12 and 14. Extending laterally or transversely of the vehicle frame 10 at one end thereof is a conventional vehicle bumper, generally designated 16. In accordance with the present invention, the bumper 16 is adapted to be operatively supported upon the frame members 12 and 14 by means of a pair of energy absorber units, generally designated by the numeral 20, the units 20 generally functioning to absorb the impact energy created upon engagement of the bumper 16 with an object at relatively low vehicle speeds, i.e., in the order of 0 to 10 miles per hour, whereby to prevent the impact energy from being transmitted to the frame 10 and thus minimize damage to the vehicle. It will be appreciated that the bumper 16 may be located at the front or rear of the associated vehicle and that the energy absorber units 20 may therefore be utilized in absorbing the impact energy of both front and rear end collisions. By virtue of the fact that the units 20 associated with the bumper 16 are identical in construction and operation, the following detailed description of one of said units will be applicable to either of those shown in FIG. 1, as will be apparent to those skilled in the art.

As best illustrated in FIG. 2, the energy absorber unit 20 of the present invention comprises an elongated cylindrical tube or housing member 22 which is adapted to be fixedly secured to the associated of the frame members 12 or 14 by means of an annular attachment ring 24. The ring 24 extends around the outer periphery of the housing member 22 and comprises a generally axially extending section 26 adapted to be secured, as by welding, to the outer periphery of the member 22 adjacent the end thereof confronting the bumper 16. The attachment ring 24 comprises a radially outwardly extending section 28 which is formed integrally of the section 26 and is formed with a plurality of axially extending apertures 30. The attachment ring 24 is adapted to be fixedly secured to a suitable mounting bracket or the like 32 secured by means of suitable screws, bolts or the like 34 to the associated frame member 12 or 14. The mounting bracket 32 is formed with a central, large diameter opening 35 through which the inner end of the unit 20 extends, as best seen in FIG. 2. Additionally, the bracket 32 is formed with a plurality of apertures 36 which are adapted for alignment with the apertures 30 of the attachment ring 24, whereby a plurality of suitable screws, bolts or the like 38 may be inserted through the respective pairs of aligned apertures 30, 36 and be provided with conventional nuts 40 for operatively securing the attachment ring 24 to the mounting bracket 32 and hence secure the energy absorber unit 20 to the vehicle frame 10.

The energy absorber unit 20 of the present invention comprises a second elongate cylindrical housing member 42 which is slightly smaller in diameter than the member 22 and is adapted to be telescopically received therewithin, as best seen in FIG. 2. One end of the housing member 42 is provided with an end plate member 44 comprising a central annular embossed portion 46 that is adapted to be nestingly inserted into the adjacent end of the housing member 42 for properly orienting or positioning the members 42, 44. The end plate member 44 is adapted to be fixedly secured to the adjacent end of the housing member 42 by means of welding or the like designated by the numeral 48, and the member 44 comprises an outwardly extending peripheral flange section 50 which is formed with a plurality of apertures 52. The member 44 is adapted to be fixedly secured to the associated vehicle bumper 16 by means of a suitable mounting bracket 54 comprising a central or intermediate section 56 that is adapted to be secured to the interior side of the bumper 16 by means of suitable screws, bolts or the like 58 and nuts 60. The upper and lower ends of the bracket 54 comprise inturned, generally coplanar flanges 62 and 64 which are formed with suitable apertures 66 adapted for alignment with the apertures 52, whereby suitable screws, bolts or the like 68 may be inserted through the aligned apertures 52, 66 and be provided with nuts 70 to operatively secure the adjacent end of the energy absorber unit 20 to the bumper 16.

While the above described manner of operatively securing the housing members 22, 42 to the vehicle frame 10 and bumper 16 has been found to be highly satisfactory and preferable for purposes of simplicity of manufacture, assembly and installation, it will be appreciated that various alternative means may be utilized in operatively mounting the energy absorber unit 20 without departing from the scope or fair meaning of the present invention.

Referring still to FIG. 2, the end of the housing member 22 opposite the attachment ring 24 is provided with an end closure plate 72 which is adapted to be secured as by welding 74 within the end of the member 22 and thereby define one end of a variable volume cylindrical fluid chamber or reservoir, generally designated 76. The opposite end of the chamber 76 is defined by an annular end plate 78 that is formed with a central axially extending orifice 80 which communicates at one end thereof with the chamber 76. The end plate 78 is adapted to be fixedly secured to the adjacent end of the housing member 42 by having said end swaged around the outer periphery of the plate 78, as seen at 82, with the swaged end portion 82 being formed with a radially inwardly extending lip portion 84 which overlies the radial face of the end plate 78 confronting the chamber 76. The end plates 46 and 78, along with the housing member 42, define a second cylindrical chamber, generally designated by the numeral 86, which is communicable via the orifice 80 with the chamber 76 and is adapted to receive hydraulic fluid, such as oil or the like from the chamber 76 to control or dampen longitudinal telescopic movement of the housing member 42 with respect to the member 22 and thereby operate to absorb or dissipate impact energy created upon engagement of the bumper 16 with an object, as will hereinafter be described in detail.

In order to assure against any axial misalignment between the housing members 22, 42 upon relative longitudinal telescopic movement therebetween and also to provide a strong durable construction, the swaged portion 82 on the one end of the housing member 42 is formed with an annular cylindrical surface 88 that is substantially the same diameter as the inner diameter of the housing member 22 and is adapted for longitudinal sliding engagement therewith. The surface 88 is cooperable with a cylindrical spacer ring 90 which extends around the outer periphery of the housing member 42 and is secured thereto, as by welding 92, at a position preferably, but not necessarily, equidistant from the opposite ends thereof. The ring 90 defines an outer cylindrical surface 94 which is of the same diameter of the surface 88 and with the surface adapted for sliding engagement with the inner periphery of the housing member 22. It will be noted that the axial end of the housing member 22 adjacent the bumper 16 is tapered or swaged inwardly as seen at 96, whereby to limit longitudinal outward unit of the housing member 42 with respect to the housing member 22, as will be apparent. Additionally, it will be seen that the suitable cup-type fluid seal 98 is provided adjacent the spacer ring 90 between the inner periphery of the housing member 22 and the outer periphery of the housing member 42, whereby to provide against fluid leakage. It will also be noted that the above described construction assures that the unit 20 may be subjected to considerable bending forces, as might occur when a collision occurs between vehicles having misaligned bumpers or when the associated vehicle is being jacked up by the bumper 16.

In accordance with the present invention, and as previously stated, the variable volume chamber 76 is adapted to be provided with a quantity of hydraulic fluid, which fluid, upon telescopic inward movement of the housing member 42, will be forced through the orifice 80 and into the chamber 86. Such fluid is adapted to be cooperable with a non-linear high energy spring means which is contained within the chamber 86 in damping or dissipating impact energy. The high energy spring, in accordance with the present invention, comprises an elongated, cylindrical cartridge, generally designated by the numeral 100, that is fabricated of a resilient elastomeric material which is adapted to be compressed by the aforesaid fluid as it is forced from the chamber 76 through the orifice 80 into the chamber 86, with the result that the impact energy is absorbed not only by the resistance to fluid flow through the orifice 80, but also by the inherent resilient characteristics of the cartridge 100, as will be described in connection with the overall operation of the energy absorber unit 20.

While the cartridge 100 may be fabricated of a wide variety of different types of resilient elastomeric materials, such as various types of well known material or synthetic rubbers, the cartridge 100 is preferably fabricated of a micro cellular resilient material, preferably, a flexible urethane elastomer, which is of a type adapted to withstand oil absorption and provide the desired non-linear spring characteristics. The specific type of urethane material which has been found to be highly satisfactory consists of an open-celled or articulated flexible polyurethane foam having an integral oil impervious skin which completly encloses the cartridge to insure against oil absorption. It will be appreciated that while an integral fluid impervious skin is preferable on the cartridge 100, various other types of fluid impervious barriers could be used, such as a polyethylene enclosure, or the like.

It will be seen that the cartridge 100 substantially fills the chamber 86 with the cartridge 100 having a first end portion 102 which bears against the end plate member 44, and an opposite end portion 104 which bears against the end plate 78. If desired, the cartridge 100 may be made slightly oversized so that when it is assembled between the plates 46, 78, the cartridge 100 will be slightly compressed or preloaded in order to achieve certain desired operational characteristics.

Referring now to the overall operation of the energy absorber unit 20 of the present invention, the unit 20, as well as the associated unit 20 located at the opposite end of the bumper 16, is normally disposed in its extended configuration shown in FIG. 2. At such time as the bumper 16 is subjected to an impact force, for example, in the event an associated vehicle collides with an object, the bumper 16 as well as the housing member 42 will be biased toward the right in FIG. 2. When this occurs, the volume of the chamber 76 will be reduced and the hydraulic fluid therewithin will be forced out of the chamber 76 thorugh the orifice 80 into the chamber 86 containing the cartridge 100. The size of the orifice is calibrated so that a preselected force to telescopic movement of the housing member 42 relative to the housing member 22 is achieved. Such force is typically in the order of ten to twelve thousand pounds, which force, of course, causes the vehicle to rapidly begin to decelerate, and at the same time, the fluid which is flowing through the orifice 80 into the chamber 86 causes the cartridge 100 to be compressed, thereby causing further deceleration of the vehicle. A unique feature of the present invention resides in the fact that as the velocity of the vehicle decreases, so does the hydraulic force, or force created by the fluid flowing through the orifice 80; however, as the hydraulic force decreases, the cartridge 100 is becoming further compressed resulting in an increased spring force which complements the decreasing hydraulic force to provide an approximately constant displacement curve which enables the entire impact force to be dissipated in a very short distance, such as in the order of approximately 3 inches. The reason for this resides in the fact that both the cartridge 100 and orifice 80 provide non-linear resistance forces which are complementary to one another and result in a relatively constant overall or total resistance force. A noteworthy feature of the present invention resides in the fact that the axial dimension of the cartridge 100 may be and preferably is selected such that when the cartridge 100 is completely or nearly completely compressed, there is no "bottoming out" and thus there is no metal to metal contact between the members 72, 78 which might result in excessive damage to the vehicle frame or chassis. Due to the particular non-linear performance characteristics of the cartridge 100, there is a gradual increase in the resistance force provided thereby at the approximate time the cartridge 100 is nearly compressed. This increase in force is found to be desirable to prevent a sudden change in resistant force which would occur when the cartridge reaches its fully compressed condition during an energy absorbing cycle. Another feature of the present invention resides in the fact that the wall thickness of the housing members 22, 42 may be selected such that in the event the bumper 16 engages an object with an impact force in excess of the design capacity of the unit 20, the walls of the members 22, 42 will bulge or deform outward slightly, whereby to absorb additional impact energy and thus prevent such additional energy being transmitted to the vehicle frame or chassis 10.

After the impact force or energy has been dissipated by the unit 20 resulting in the cartridge 100 being compressed, the natural resilient character of the material constituting the cartridge 100 will force the hydraulic fluid within the chamber 86 back through the orifice 80 into the chamber 76 and return the unit 20 to its extended position shown in FIG. 2 to prepare the vehicle for a subsequent collision or other source of high impact energy.

In certain instances, it may be desirable to provide a threshold force to telescopic movement of the housing member 42 with respect to the member 22. In accordance with the present invention, such means may be provided by a valve arrangement for initially preventing fluid flow from the chamber 76 through the orifice 80 into the chamber 86. Such valve means would typically operate as a "hold-off" valve to prevent fluid flow through the orifice 80 until a predetermined impact force is exerted against the bumper 16. By way of example, the typical valve means is respectively illustrated in FIG. 3 and generally designated as a valve assembly 106. The assembly 106 is shown operatively mounted within the chamber 86 and comprises a valve member 108 which is adapted to be biased into engagement with the end plate 78 by a suitable valve spring 110, whereby to block fluid flow through the orifice 80. Both the valve member 108 and valve spring 110 are operatively mounted within a suitable valve cage or enclosure 112 which comprises a central cup shaped portion 114 and a peripheral flange portion 116. As illustrated, the enclosure 112 is operatively received within a suitable annular recess 118 formed in the adjacent end of the cartridge 100. The flange portion 116 is formed with a plurality of fluid flow orifices 120 which are communicable via a suitable annular recess 122 formed in the face of the enclosure 112 confronting the end plate 78, whereby when the valve member 108 is disposed in a retracted or open position against the resistance of the spring 110, fluid may flow through the orifice 80, recess 122 and orifices 120 into the chamber 86. It will be noted that the valve member 108 may be formed with a central bore 124 which communicates through an aligned bore 126 in the enclosure 112. The reason for the bores 124, 126 is that at the beginning of an energy absorbing cycle, there is a substantially large pressure drop across the valve member 108 and thus a pressure drop across the bore 126. Accordingly, as pressure builds up within the chamber 86, the pressure drop across the orifice 126 decreases, allowing the spring 110 to start closing the valve member 108; this, in turn, prevents the force resisting compression of the unit 20 from being decreased due to reduced velocity. A suitable bore 128 may be and preferably is formed in the end plate 78 in alignment with the recess 122, which bore 128 may be provided with a suitable "one-way" check valve or the like 130 which functions to communicate fluid back to the chamber 76 after each energy absorbing cycle.

It will be seen that when the energy absorber unit 20 is provided with the valve assembly 106, fluid will be prevented from flowing into the chamber 86 until the force of the spring 110 is overcome. This spring orifice combination may be calibrated to any degree of force, depending upon the desired operational characteristics of the unit 20. It may be noted, of course, that the spring 110 need not be of the coil or helical type illustrated herein, since it could be fabricated of an elastomeric material such as rubber, urethane or the like, where size and capacity dictate.

With reference to FIG. 4, for certain operative installations, it may be desirable to utilize the valve assembly 106, as above described, in conjunction with an additional flow orifice, such as that designated by the numeral 132 which would function with the cartridge 100 to give a closer approximation of a "square" or constant force displacement curve.

It will be seen from the foregoing that the present invention provides a novel energy absorber unit which is designed to overcome the myriad of problems in connection with prior known devices, as well as satisfy the rigorous demands of the automotive industry. A particular feature of the present invention resides in the fact that relatively high impact energy can be absorbed with a very short or small degree of telescopic movement of the housing members 22, 42, whereby the unit 20 may be installed without seriously affecting the aesthetic appearance of the associated vehicle.

Another feature of the present invention resides in the fact that as fluid is forced from the chamber 76 through the orifice 80 into the chamber 86, in order to effect compression of the cartridge 100, the end of the cartridge 100 adjacent the orifice 80 will move away therefrom at a predetermined rate, depending primarily upon the size of the orifice and physical characteristics, i.e., density, etc., of the cartridge 100. By properly selecting the material from which the cartridge 100 is fabricated, as well as properly designing the physical dimensions of the housing members 22, 42 and orifice 80, the end portion 104 of the cartridge 100 will function to vary the discharge coefficient of the orifice 80 as it moves away from the end plate 78 during an energy absorbing cycle. Another feature of the present invention resides in the fact that the unit 20 will be formed to be of an extremely strong and durable construction, will require relatively small tooling costs and will have a long and effective operational life.

While it will be apparent that the preferred embodiments illustrated herein are well calculated to fulfill the objects above stated, it will be appreciated that the present invention is susceptible to modification, variation and change without departing from the scope of the invention.

We claim:

1. In an energy absorbing unit,
a first generally cylindrical housing member,
a second generally cylindrical housing member adapted for telescopic engagement with said first member,
means defining a fluid chamber in one of said members and a flow control orifice communicating said chamber with the other of said members, a high energy spring disposed in said other housing member, said spring being fabricated of resilient elastomeric cellular material and comprising an elongated cylindrical body of substantially the same cross-sectional size as the interior of said other housing member and occupying substantially the entire interior volume thereof, whereby the longitudinally opposite ends of said body are disposed directly adjacent the ends of said other housing member, whereby any fluid transmitted through said orifice into said other housing results in compression of said body, with the resistance to compression of said spring and the resistance to fluid flow through said orifice being complementary and providing a relatively constant overall resistant force.

2. The invention as set forth in claim 1 which includes valve means for controlling fluid flow from said chamber to said other housing member.

3. The invention as set forth in claim 1 which includes means for varying the discharge coefficient of said orifice.

4. The invention as set forth in claim 1 which includes first and second orifice means communicating said chamber with said other housing member.

5. The invention as set forth in claim 4 which includes valve means for controlling fluid flow through one of said orifices, said valve means acting as a hold-off means to prevent compression of said spring until a preselected fluid pressure is achieved.

6. The invention as set forth in claim 1 wherein said spring is non-linear.

7. In a device for absorbing the impact energy of a vehicle bumper, an elongated cylindrical housing comprising first and second generally axially aligned telescopic housing sections, a non-linear high energy absorbing spring occupying a portion of said housing, a fluid chamber occupying the remaining portion of said housing, fluid flow control means disposed between said chamber and said spring through which fluid may flow from said chamber to effect compression of said spring, means extending generally transversely of one of said housing sections and movable axially therewithin for varying the operational characteristics of said fluid control means, and means for operatively supporting said device at a position wherein said spring is adapted to absorb the impact force transmitted to the vehicle bumper upon engagement thereof with an object.

8. The invention as set forth in claim 7 wherein said fluid flow control means includes means defining an orifice through which fluid flows to compress said spring, and wherein said operational characteristic varying means includes means for varying the discharge coefficient of said orifice.

9. The invention as set forth in claim 8 wherein a portion of said body is operable to vary the discharge coefficient of said orifice.

10. The invention as set forth in claim 7 which includes means providing a fluid impervious barrier around said body.

11. The invention as set forth in claim 10 wherein said barrier comprises an integral fluid impervious skin on said body.

12. An energy absorbing unit comprising a first elongated tubular housing having means defining an orifice at one end thereof, a cylindrical resilient elastomeric member disposed within said housing and occupying substantially the entire interior volume thereof, with one end of said member being disposed directly adjacent said orifice and acting to prevent the free flow of fluid therethrough, a second tubular housing telescopically movable relative to said first housing and defining a fluid chamber, a quantity of fluid in said chamber adapted to be forced through said orifice upon telescopic movement of said first and second housings, and means including said one end of said member providing for a variable discharge coefficient of fluid flow through said orifice.

13. The invention as set forth in claim 12 wherein said last mentioned means includes a radially disposed end of said member movable in response to compression of said elastomeric member toward and away from said orifice.

14. The invention as set forth in claim 12 wherein said elastomeric member is fabricated of a flexible urethane elastomer.

15. The invention as set forth in claim 12 which includes valve means for controlling fluid flow through said orifice.

16. In an energy absorbing unit, a first generally cylindrical housing member, a first element at one end of said member, a second generally cylindrical housing member telescopically movable relative to said first member, a fluid chamber in one of said members and means including a second element at the opposite end of said first housing member from said first element defining a flow control orifice communicating said chamber with the other of said members, a quantity of fluid in said chamber, a high energy spring disposed in said other of said housing member and adapted to be compressed under the influence of fluid communicated from said chamber through said orifice into said other member, said spring comprising a resilient elastomeric cellular body of a generally cylindrical configuration normally occupying substantially the entire interior volume of said first housing member and having the axially opposite ends juxtapositioned said first and second elements, and means including said spring for controlling the flow of fluid from said chamber into said other housing member, whereby fluid will not flow from said chamber into said first housing member until preselected telescoping movement occurs between said first and second housing members.

17. The invention as set forth in claim 16 wherein said valve means comprises a valve member, and means resiliently urging said valve member toward a position closing said orifice.

18. The invention as set forth in claim 17 which includes means for supporting said valve member and said resilient means adjacent said orifice.

19. The invention as set forth in claim 18 wherein said support means comprises a valve cage.

20. The invention as set forth in claim 16 wherein said valve means comprises check valve means for controlling flow from said other member to said chamber.

21. The invention as set forth in claim 16 which includes means communicating said chamber with said other member other than said orifice for permitting fluid flow from said chamber to said other member at energy levels lower than that necessary to open said valve means.

22. In an energy absorbing unit,
a first generally cylindrical housing member,
a second generally cylindrical housing member adapted for telescopic engagement with said first member,
means defining a fluid chamber in one of said members and a flow control orifice communicating said chamber with the other of said members,
a high energy spring disposed in said other of said housing member and adapted to be compressed under the influence of fluid communicated from said chamber,
said spring being fabricated of a resilient elastomeric cellular material and being of an elongated cylindrical configuration having one end thereof disposed adjacent said orifice, and
valve means for controlling the flow of fluid from said chamber into said other housing member, whereby said spring will not be compressed by said fluid until the pressure of said fluid reaches a predetermined level, said one end of said spring being of a generally complementary configuration with respect to said valve means.

23. An energy absorber comprising,
a first hollow cylindrical housing member having an interior chamber defined at one end thereof by support means for said housing member and at the opposite end thereof by an orifice defining element,
a compressible spring in said first housing member and occupying substantially the entire volume of said chamber,
a second hollow cylindrical housing member telescopically supported relative to said first member and having mounting means at one end thereof,
a fluid compartment within said second housing member and defined by said mounting means thereof and said orifice defining element, and
means for compressing said spring in response to fluid flowing from said compartment through said orifice into said chamber.

24. The invention as set forth in claim 23 which includes a valve for controlling fluid flow through said orifice.

25. The invention as set forth in claim 24 wherein said spring comprises a generally radially disposed end portion located directly adjacent said element when said spring is in a non-compressed condition, and wherein said surface is cooperable with said orifice in varying the discharge coefficient thereof.

26. In an energy absorbing unit,
a housing including first and second sections,
first force damping means including a quantity of fluid in said first section, a restricted orifice defining member separating said sections, and second force damping means including a compressible spring disposed in said second section and adapted to be compressed by fluid passing through the orifice in said member, means in said second section normally disposed adjacent said orifice for preventing the free flow of fluid from said first section through said orifice to said second section,
first and second generally tubular telescopic housing members, one of said members defining a fluid reservoir and the other of said members adapted to contain said spring,
the damping force of said second damping means increasing at approximately the same rate as the damping force of said first damping means decreases, whereby a substantial constant resultant damping force is provided.

27. The invention as set forth in claim 26 which includes means for resisting fluid flow through said orifice until a preselected force is exerted against said unit.

28. The invention as set forth in claim 27 which includes valve means for controlling fluid flow through said orifice.

29. The invention as set forth in claim 26 wherein said spring is fabricated of a flexible urethane elastomer.

30. The invention as set forth in claim 29 wherein said spring comprises a generally cylindrically shaped cartridge.

* * * * *